UNITED STATES PATENT OFFICE.

ROBERT E. KINKEAD, OF CLEVELAND, OHIO, ASSIGNOR TO THE LINCOLN ELECTRIC COMPANY, OF CLEVELAND, OHIO, A CORPORATION OF OHIO.

ARC-WELDING ELECTRODE.

1,329,530.     Specification of Letters Patent.     Patented Feb. 3, 1920.

No Drawing.     Application filed November 1, 1919. Serial No. 335,118.

*To all whom it may concern:*

Be it known that I, ROBERT E. KINKEAD, a citizen of the United States of America, residing at Cleveland, Cuyahoga county, Ohio, have invented new and useful Arc-Welding Electrodes, of which the following is a specification.

This invention relates to welding electrodes.

This invention has utility when incorporated in connection with iron negative electrodes for autogenous welding, having great utility in rendering quickly available usual iron wire even in work to pass the most rigid requirements.

In welding operations, say with the use of direct electric current and a voltage of 40 volts, considerable difficulty is experienced in maintaining an arc, for which purpose the line is frequently designed to have a reserve to boost the pressure up to say 70 volts. One terminal may be connected to the work and the other manipulated by the operator, provided with a screen to shield his eyes from the intense rays of the arc. Again, each of the electrodes may be in the hands of the operator.

The negative electrode may be fused off as a liquid puddle in the filling up of holes or defects in castings, breaks in metal structures, or for uniting pieces of metal. A great field for the electric welding operations is in the handling of iron and steel. As heretofore practised, many expedients have been undertaken to make more easy the manual maintenance of the arc. Departure from uniformity in the electrode, or slight change of distance may quench or freeze the arc.

Herein these difficulties are greatly minimized and coincident therewith, a cheap electrode is produced. While a tubular rod or wire may be filled with finely subdivided or powdered iron, for practical purposes an ordinary iron wire such as may be produced in ordinary commercial or run of mill operations, even without other than usual practice in refinements, may answer as the iron base for the electrode herein. Before use, such base, of the desired gage and length may be rolled in the iron flour or powderel iron, and is then ready for immediate use as a welding electrode.

Should it be desired to prepare the wire for electrodes with an interval before use, or shipment before use, it may then be more desirable than merely rolling the lengths of wire in the flour or iron, or packing such in a box or container with some of the loose flour or powder or iron to shake through thereon. To this end the powdered iron may be caused to adhere, say even by corroding such thereon with salamoniac solution, copper sulfate solution, or such soluble salts. In practice it is aimed to have the coating very thin—in fact of almost inappreciable thickness, for this finely subdivided iron material in the heat of the arc is much more readily vaporizable than the iron base, and this magnetizable or conducting vapor affords an envelop about the welding region of the arc as a current path making more easy the maintenance of the arc with distance variations. Furthermore, the normal impurities or departures from uniformity in the character of the iron wire base in no wise detract from the smoothness of welding operation. The gaseous iron envelop is of a flux nature in so far as it assists arc formation and maintenance, but is non-slagging in its nature, for herein there is formed a most pure iron weld which may be protected from oxidation by the brown coating of condensed iron oxid vapor from the powdered iron deposited about the weld. This iron gas holds the arc in the least stable regions.

Another type of binder may be calcium sulfate, even up to twenty per cent. in volume of the powdered iron. Molasses may also be used to insure the powdered iron against sifting away from the wire. However, a desirable binder is shellac, and with an additional coating of the shellac without the iron flour therein over the iron flour and shellac coated electrode, there is produced an insulated coated electrode, which may be operated in crevices or holes without danger of arcing at points away from the terminus.

What is claimed and it is desired to secure by Letters Patent is:

1. A negative electrode comprising iron, and continuously therealong a supply of powdered iron of such subdivision as to supply iron vapor for arc maintenance during puddling of the iron of the electrode into a weld.

2. An electrode comprising run-of-mill iron wire, and a powdered iron coating therefor vaporizable for maintaining a region of arc activity of weld contributing material.

3. An electrode for autogenous welding comprising a base of iron, and a more readily volatile iron supply therealong as a nonslagging flux.

4. An electrode of ordinary commercial iron wire base and a coating therefor of a flour of iron.

5. An insulated coated electrode having continuously therethrough a base of iron and a flour of iron.

In witness whereof I affix my signature.

ROBERT E. KINKEAD.